United States Patent [19]

Sakano

[11] 4,352,050
[45] Sep. 28, 1982

[54] METHOD AND APPARATUS FOR ERROR CORRECTION IN POSITION SENSING CIRCUIT

[75] Inventor: Tetsurou Sakano, Mitaka, Japan

[73] Assignee: Fujitsu Fanuc Limited, Tokyo, Japan

[21] Appl. No.: 282,269

[22] Filed: Jul. 10, 1981

[30] Foreign Application Priority Data

Jul. 14, 1980 [JP] Japan ................................ 55-95976

[51] Int. Cl.³ .............................................. G05B 1/06
[52] U.S. Cl. .................................. 318/661; 318/632; 340/347 SY
[58] Field of Search .............. 318/661, 660, 654, 608, 318/632; 340/347 SY

[56] References Cited

U.S. PATENT DOCUMENTS

| | | | |
|---|---|---|---|
| 3,646,547 | 2/1972 | Hoffman | 340/347 SY |
| 4,268,786 | 5/1981 | Röhrle | 340/347 SY |
| 4,282,468 | 8/1981 | Barker et al. | 318/661 X |
| 4,310,790 | 11/1982 | Marquis | 318/661 X |

FOREIGN PATENT DOCUMENTS

2754945 6/1978 Fed. Rep. of Germany ...... 318/661

Primary Examiner—B. Dobeck
Attorney, Agent, or Firm—Staas & Halsey

[57] ABSTRACT

A method and apparatus for correcting an error in a position sensing circuit employing a resolver, an Inductsyn (trade name) or the like. Accurate position sensing is not possible in a position sensor using a resolver or the like when the electromagnetic coupling between the secondary winding and a cosine excitation coil is different from that between the secondary winding and a sine excitation coil. To eliminate a position sensing error caused by such a disparity in electromagnetic coupling, the present invention varies an electrical angle $\alpha$ by a predetermined amount at a first position where the secondary winding is electromagnetically coupled mainly with the cosine excitation coil, and at a second position where the secondary winding is electromagnetically coupled mainly with the sine excitation coil, finds the amount of change in the secondary voltage, or in a frequency proportional thereto, which accompanies the change in the electrical angle, and regulates the excitation voltage of each of the excitation coils in such a manner that the amount of change at the first and second positions is equal.

6 Claims, 15 Drawing Figures

METHOD AND APPARATUS FOR ERROR CORRECTION IN POSITION SENSING CIRCUIT

BACKGROUND OF THE INVENTION

This invention relates to a method and apparatus for error correction in a position sensing circuit and, more particularly, to a method and apparatus for error correction in a DSCG (digital sine-cosine generator)-type position sensing circuit that employs a resolver or the like as the position sensing circuit.

A resolver or Inductsyn (trade name) is widely employed as a position sensor in servo control. The resolver has primary windings (stator windings) constituting a cosine excitation coil and sine excitation coil so arranged that a phase difference of $\pi/2$ exists between the two coils, and a secondary winding (rotor winding) that revolves with respect to the primary windings in accordance with the rotation of a motor or the like.

If primary voltage signals $E_a$, $E_b$ given by the equations $$E_a = E_{c0} \cdot \cos\alpha \cdot \sin wt \tag{1}$$

$$E_b = E_{s0} \cdot \sin\alpha \cdot \sin wt \tag{2}$$

are impressed upon the respective cosine and sine excitation coils comprising the primary windings when the turning angle (referred to as the mechanical angle) of the secondary winding is $\theta$, then a secondary voltage $E_o$ is induced in the secondary winding. This secondary voltage is given by the following equation:

$$\begin{aligned} E_o &= E_a \cdot \sin\theta - E_b \cos\theta \\ &= E_{c1}\cos\alpha \cdot \sin wt \cdot \sin\theta - E_{s1} \cdot \sin\alpha \cdot \sin wt \cdot \cos\theta. \end{aligned} \tag{3}$$

Here $\alpha$ is an electrical angle which will be described later, and $E_{s1}$, $E_{c1}$ are values proportional to $E_{s0}$, $E_{c0}$, respectively. These constants depend upon the degree of electromagnetic coupling between the secondary winding and each of the excitation coils. If $E_{s1} = E_{c1} = E_1$, the secondary voltage $E_o$ will be given by $$E_o = E_1 \sin(\theta - \alpha) \cdot \sin wt \tag{4}$$

Accordingly, if the electrical angle $\alpha$ is so varied as to make the quantity $(\theta - \alpha)$ equal to zero $(\theta - \alpha = 0)$, and if the change in the value of the electrical angle $\alpha$ is monitored, then it is possible to sense the position or amount of movement of a moving body such as a motor.

The DSCG-type position sensing system operates on the foregoing position sensing principle. A position sensing circuit based on the DSCG position sensing method includes a smoothing circuit for smoothing the secondary voltage signal $E_o$, a voltage-frequency converter for generating a pulse train of a speed which is in accordance with the output voltage of the smoothing circuit, a primary voltage generating circuit for so varying the electrical angle $\alpha$ in accordance with the number of pulses in said pulse train as to make the quantity $(\theta - \alpha)$ equal to zero, the circuit accomplishing this by generating the primary voltage signals $E_a$, $E_b$ through digital processing, and a counter circuit for counting the number of pulses in the pulse train. The counter circuit is adapted to count up or to count down the pulses in accordance with the direction of movement of the moving body, so that the value of the count within the counter will represent the current position of the moving body.

In a DSCG position sensing system, it is obvious from equation (3) that $E_{c1}$ and $E_{s1}$ must be equal in order to avoid an error in the measurement of position. However, $E_{c1}$ and $E_{s1}$ will not be equal in equation (3) even if $E_{c0}$ and $E_{s0}$ are made equal in equations (1) and (2). This is because the degree of electromagnetic coupling between the cosine excitation coil and the secondary winding, which is the sensing coil, is different from the degree of electromagnetic coupling between the sine excitation coil and the secondary winding.

BRIEF SUMMARY OF THE INVENTION

The present invention seeks to provide a method and apparatus through which the position of a moving body can be sensed with a high level of accuracy.

Accordingly, an object of the present invention is to provide a method and apparatus for error correction in a position sensing circuit, wherein the conditions $E_{c1} = E_{s1}$ in equation (3) can be satisfied in a simple manner.

Another object of the present invention is to provide a method and apparatus for error correction in a position sensing circuit through which the current position, amount of movement and traveling speed of a moving body can be sensed with a high level of accuracy.

Other features and advantages of the invention will be apparent from the following description taken in conjunction with the accompanying drawings.

DESCRIPTION OF THE PREFERRED EMBODIMENT

Figure 1:
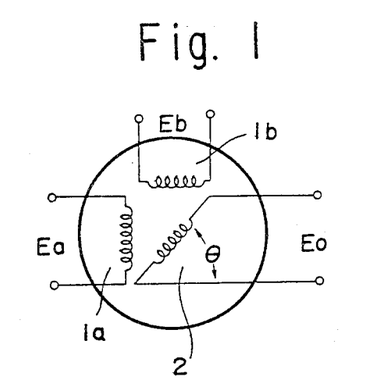
FIG. 1 is an illustrative view useful is describing the operation of a resolver.

Reference will first be had to FIG. 1 to describe the operation of a resolver. Numerals 1a, 1b denote a sine excitation coil and cosine excitation coil, respectively, the coils being arranged so that a phase difference of $\pi/2$ is established between them. A secondary winding (rotor winding) 2 revolves with respect to the primary windings in accordance with the rotation of a motor or the like. If primary voltages $E_a$, $E_b$ given by the aforementioned equations (1), (2) are applied to the respective cosine and sine excitation coils 1a, 1b when the mechanical angle of the secondary winding 2 is $\theta$, then a secondary voltage expressed by the aforementioned equation (3) will be delivered by the secondary winding. The secondary voltage will be expressed by equation (4) if the condition $E_{c1} = E_{s1} = E_1$ holds.

Figure 2:
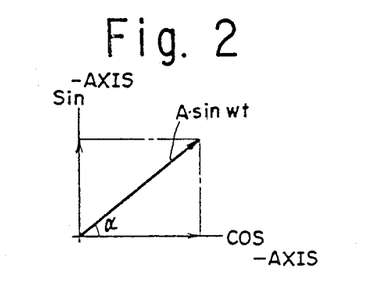
FIGS. 2 and 3 are vector diagrams useful in describing the principle of position sensing.

The principle of operation of a DSCG position sensing system will now be described with reference to the vector diagrams of FIGS. 2 and 3. If we consider an alternating current flux A·sin wt in which the direction and amplitude of the flux are constant, and if we let $\alpha$ denote the direction (i.e., the electrical angle), then the components on the cosine axis and sine axis will be $$A\cdot\cos\alpha\cdot\sin wt, \quad A\cdot\sin\alpha\cdot\sin wt \tag{5}$$

respectively. In other words, what this means is that if coils arranged along the cosine and sine axes are excited by signals expressed by A·cos$\alpha$·sin wt and by A·sin$\alpha$·sin wt, respectively, an alternating current flux having an electrical angle $\alpha$, and represented by A·sin wt, will be obtained. Accordingly, an alternating current flux having an electrical angle $\alpha$, and represented by A·sin wt, will be obtained if the two primary windings 1a, 1b of the resolver are excited by signals represented by A·cos$\alpha$·sin wt and by A·sin$\alpha$·sin wt.

Figure 3:
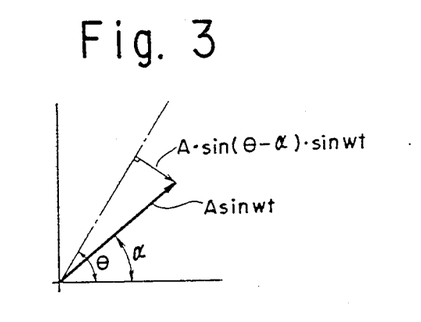

In FIG. 3, let $\theta$ be the turning angle (mechanical angle) of the secondary winding of the resolver, and let $E_o$ represent the secondary voltage that is induced by the flux component perpendicular to the secondary winding. If the primary windings 1a, 1b are excited by the signals represented by A·cos$\alpha$·sin wt and by A·sin$\alpha$·sin wt, then the secondary voltage $E_o$ will be given by $$E_o = A\cdot\sin(\theta - \alpha)\sin wt \tag{6}$$

Accordingly, if the electrical angle $\alpha$ of the alternating current flux A·sin wt is made to follow up the change in the mechanical angle $\theta$ so as to satisfy the condition $\theta - \alpha = 0$, monitoring the electrical angle $\alpha$ will permit the change in the magnitude of the mechanical angle and the position of the moving body to be detected. In other words, if the primary voltages [the expressions given in (5)] impressed upon the resolver are varied in such a manner that the electrical angle $\alpha$ is made equal to the turning angle $\theta$, and if the change in the electrical angle $\alpha$ is monitored, this will allow the change in the angle $\theta$ or the position of the moving body to be detected.

Figure 4:
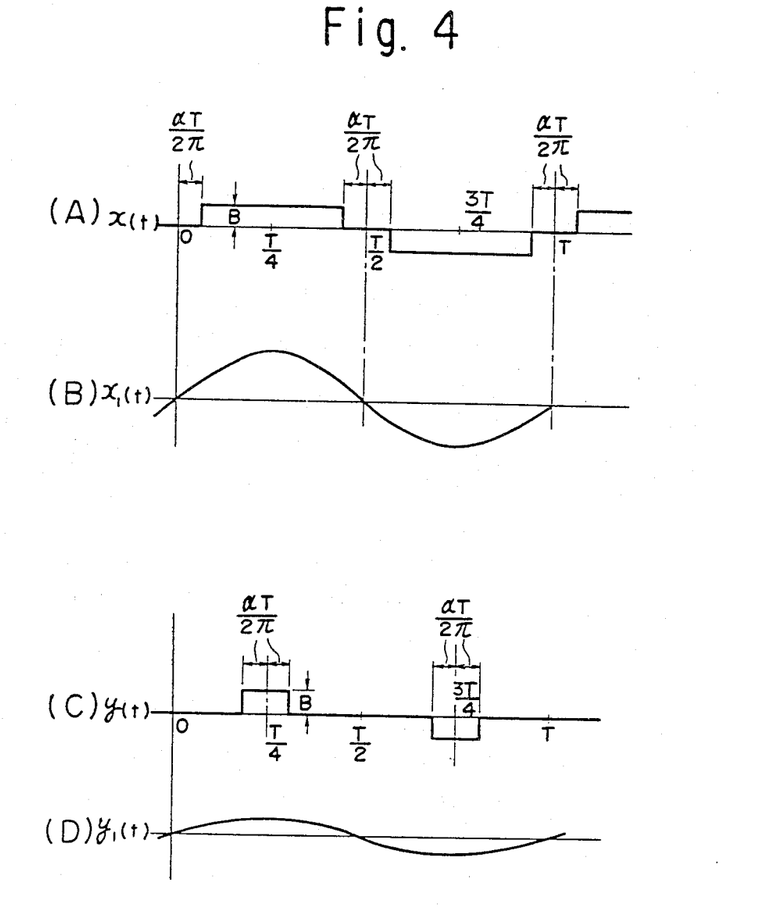
FIGS. 4 and 5 are illustrative views useful in describing the theory behind digital generation of the primary voltage of a resolver.

The primary voltages given by the expressions in (5) may be generated by digital processing. FIG. 4 is useful in explaining the principle involved. Let us consider an alternating rectangular wave signal x(t) for a case in which the amplitude is B, the period T and the angular frequency w (where $T = 2\pi/w$) as shown in FIG. 4A. Subjecting the signal x(t) to a Fourier expansion allows the signal to be written.

$$x(t) = \frac{4B}{\pi} \cdot \cos\alpha \cdot \left[ \sin wt + \tfrac{1}{3} \sin 3wt + \tfrac{1}{5} \sin 5wt + \ldots \right] \tag{7}$$

The fundamental wave component is expressed by $$x_1(t) = \frac{4B}{\pi} \cdot \cos\alpha \cdot \sin wt \tag{7'}$$

and is shown in FIG. 4(B).

On the other hand, let us now consider an alternating rectangular wave signal y(t) with the amplitude B, period T and the angular frequency w, as shown in FIG. 4(C). Applying the Fourier expansion permits the signal to be written $$y(t) = \frac{4B}{\pi} \cdot \sin\alpha \left[ \sin wt - \tfrac{1}{3}\sin 3wt + \tfrac{1}{5}\sin 5wt + \ldots \right] \tag{8}$$

The fundamental wave component is expressed by $$y_1(t) = (4B/\pi)\cdot\sin\alpha\cdot\sin wt \tag{8'}$$

and is shown in FIG. 4(D).

Accordingly, if the primary windings of the resolver are excited by the rectangular signals x(t), y(t) shown in FIGS. 4(A) and 4(C) and the secondary signal induced in the secondary winding is filtered by a filter whose center frequency is w $(=2\pi f)$, the fundamental wave given by equation (6) will be obtained.

In the arrangement of a position sensing circuit, a pulse train is generated at a frequency in accordance with the amplitude sin $(\theta = \alpha)$ of the secondary voltage $E_o$ [equation (6)] induced in the secondary winding, and the electrical angle is varied by $2\pi/N$ increments (where N is a positive number such as 4000) as the pulses are generated. In accordance with such an arrangement, the angle $\theta$ coincides with the angle $\alpha$ (i.e., $\theta$ and $\alpha$ become equal) upon the generation of $(\theta - \alpha)\cdot N/2\pi$ pulses, at which time sin $(\theta - \alpha)$ equals zero [sin $(\theta - \alpha) = 0$], thereby terminating the generation of pulses and ending the variation in the electrical angle $\alpha$. Consequently, if the pulse width of the alternating rectangular signal shown in FIG. 4(A) is narrowed incrementally by 2T/N each time a pulse is generated, and if the pulse width of the alternating rectangular wave signal shown in FIG. 4(C) is widened incrementally by 2T/N at the same time, then the electrical angle $\alpha$ will follow the mechanical angle $\theta$.

Figure 5:
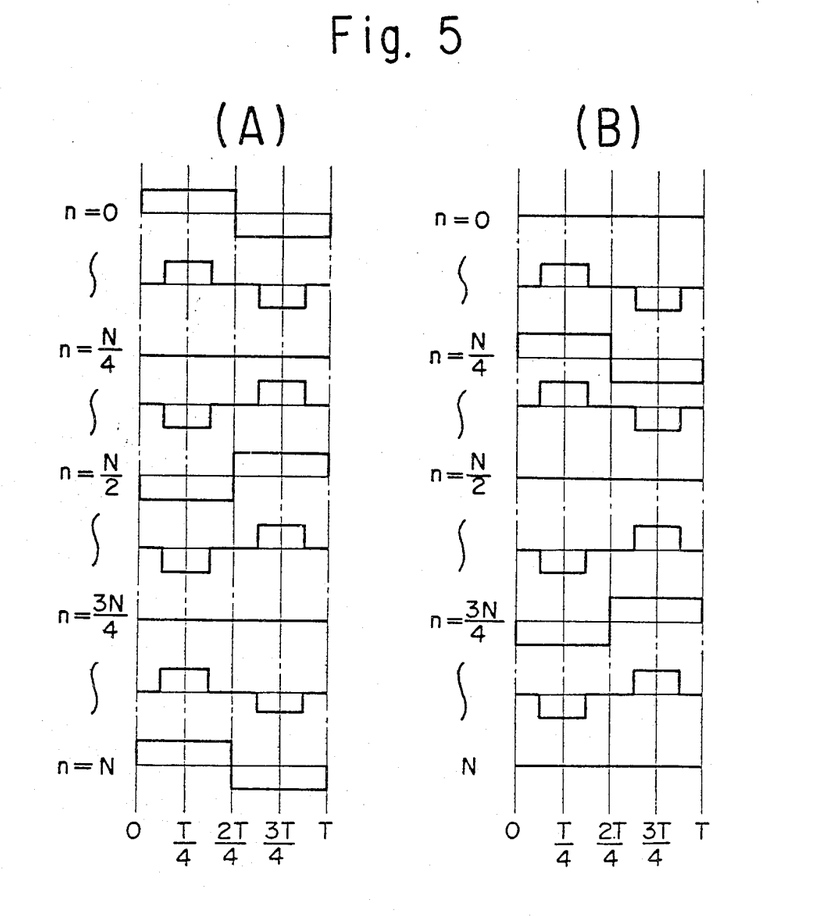

Although this point will be described in more detail later, it follows from the above that it is possible to obtain a primary voltage wherein the electrical angle $\alpha$ varies in accordance with the mechanical angle $\theta$ by providing a pulse counter capable of counting up to the number N, as well as a rectangular wave signal generating circuit, the counter being adapted to count the pulses in the pulse train successively so that the two rectangular wave signals of FIGS. 4(A) and 4(C) can be generated with pulse widths that are widened and narrowed, respectively, in accordance with the content of the counter. Furthermore, it should be noted that cos $\alpha$ is positive for values of $\alpha$ between 0 and $\pi/2$ and between $3\pi/2$ and $2\pi$ and is negative for values of $\alpha$ between $\pi/2$ and $\pi$, and between $\pi$ and $3\pi/2$, that sin $\alpha$ is positive for values of $\alpha$ between 0 and $\pi$ and is negative for values of $\alpha$ between $\pi$ and $2\pi$, and that electrical angles between 0 and $\pi/2$, $\pi/2$ and $\pi$, $\pi$ and $3\pi/2$ and between $3\pi/2$ and $2\pi$, correspond to counter contents of 0 to N/4, N/4 to N/2, N/2 to 3N/4 and 3N/4 to N, respectively. It is required, therefore, that the rectangular wave signal generating circuit mentioned above generates the signals shown in FIGS. 5(A) and 5(B) in accordance with the content of the counter.

Figure 6:
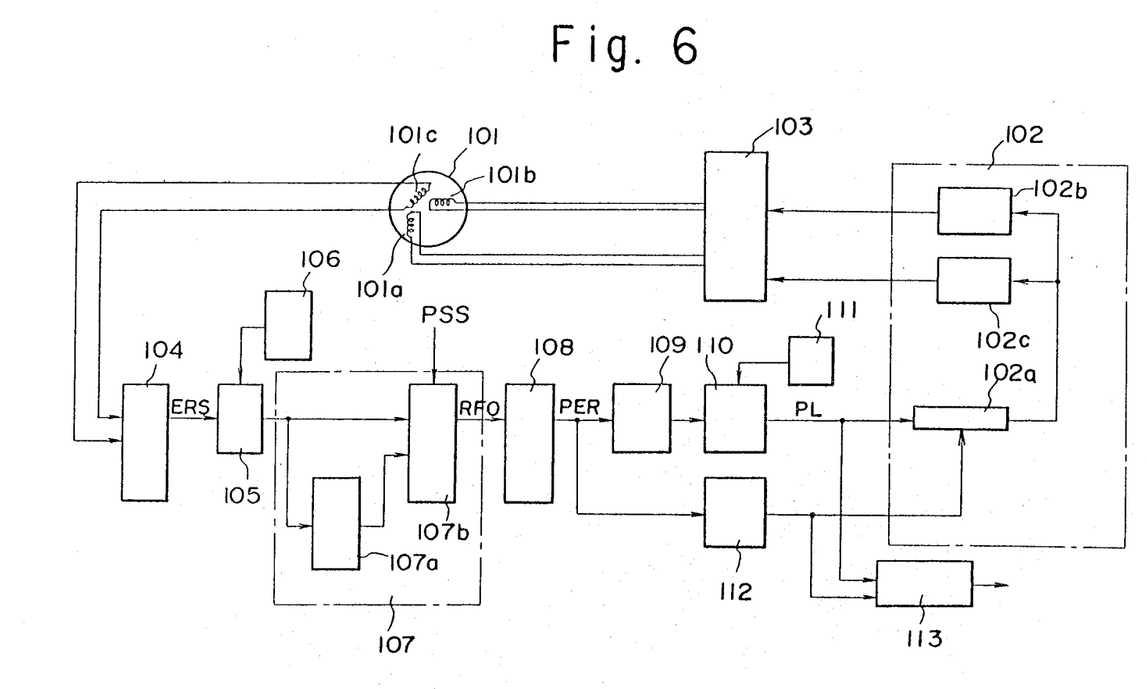
FIG. 6 is a block diagram of a position sensing circuit to which the present invention can be applied.
Figure 7:
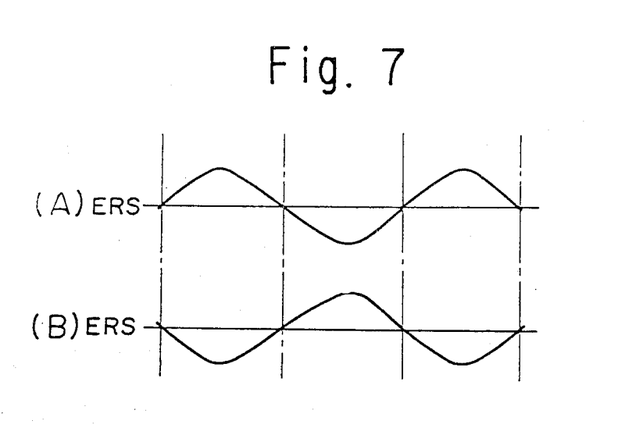
FIG. 7 is a waveform diagram of an error signal conforming to the polarity (plus or minus) of an error angle.
Figure 8:
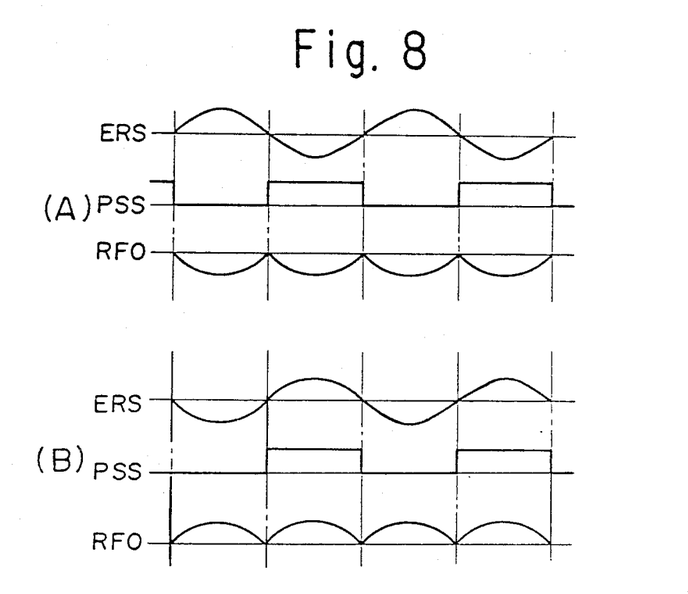
FIG. 8 is a waveform diagram of various signals which are useful in describing the operation of a synchronous rectification circuit.

A DSCG-type position sensing circuit to which the present invention can be applied is shown in the block diagram of FIG. 6. A resolver 101 includes primary windings 101a, 101b and a secondary winding 101c that revolves in accordance with the rotation of a motor or the like, which is not shown. A primary voltage generating circuit 102 includes a reversible counter 102a having a counting capacity N for counting up and counting down the pulse in a pulse train PL generated by a voltage-frequency converter to be described later, the counting direction depending upon the rotational direction of the secondary winding 101c. Also included are a cosine wave generator circuit 102b and a sine wave generator circuit 102c, for generating the primary voltages shown in FIGS. 5(A) and 5(B), respectively, in accordance with the content of the counter 102a. Connected between the primary windings 101a, 101b and the primary voltage generating circuit 102 is a resolver excitation circuit 103. Connected to the secondary winding 101c of the resolver is a band pass filter 104 of a center frequency w for passing only the fundamental wave component, expressed by equation (6), of the secondary voltage generated by the secondary winding 101c. The fundamental wave component shall be referred to an error signal ERS hereinafter. Numeral 105 denotes an amplifier, and numeral 106 denotes a gain adjustment circuit for adjusting system gain. Too low a gain when the motor or the like moves quickly through the mechanical angle $\theta$ does not permit the rate of change in the generated electrical angle $\alpha$ to attain the rate of change in the mechanical angle $\theta$, so that the electrical angle $\alpha$ cannot follow the mechanical angle $\theta$. To high a gain creates instability in the closed loop and therefore causes the electrical angle to oscillate. Numeral 107 denotes a synchronous rectification circuit. A synchronous rectification system is one in which an input signal is rectified in synchronism with the phase of the input signal. More specifically, use is made of a rectangular signal in which the change between the high and low levels occurs in synchronism with the phase of the input signal. Rectification is accomplished by delivering the input signal intact when the rectangular signal is high, and by delivering the input signal after reversing its polarity when the rectangular signal is low. The synchronous rectification circuit 107 therefore includes an inverting amplifier 107a for inverting the error signal ERS, and a rectifying switch 107b responsive to a switching signal PSS, which can be shifted in phase, to deliver the error signal ERS intact or after a reversal in polarity. Since the amplitude of the error signal ERS is sin $(\theta - \alpha)$, the error signal has the form shown in FIG. 7(A) when the error angle $(\theta - \alpha)$ is positive, and the form shown in FIG. 7(B) when the error angle $(\theta - \alpha)$ is negative. In consequence, when the phase of the error signal ERS is inverted, the synchronous rectification circuit 107 reverses the polarity of the rectified output before delivery. FIGS. 8(A) and 8(B) are waveform diagrams which show the error signal ERS, switching signal PSS and the rectified output RFO when the error angle is positive and when it is negative, respectively.

A smoothing filter 108 is connected to the output side of the synchronous rectification circuit 107 to filter the rectified output RFO. An absolute value circuit 109 takes the absolute value of the output PER obtained from the smoothing filter 108. The signal PER is a position deviation signal described below. A voltage-frequency converter 110 generates a pulse train PL of a frequency which is proportional to the output voltage of the absolute value circuit 109. A frequency adjustment circuit 111 is provided to adjust the minimum frequency of the pulse train PL. The position deviation signal PER obtained from the smoothing circuit 108 has a sign (positive or negative) which depends upon the polarity of the error angle. A sign sensing circuit 112 receives the position deviation signal PER, senses its sign, and controls the counting direction of the reversible counter 102a in the primary voltage generating circuit 102. A counter circuit 113 counts up or counts down the pulses in the pulse train PL in accordance with the direction in which the moving body travels.

The position sensing circuit illustrated in FIG. 6 operates in the following manner.

Assume that the secondary winding 101c of resolver 101 is rotated clockwise (forward direction) by a very small mechanical angle $\theta_o$ from initial conditions where $\theta = \alpha = 0$. This will cause the band pass filter 104 to deliver the error signal ERS in the form sin $(\theta_o - \alpha) \cdot$sin wt (where $\alpha = 0$). The error signal ERS is converted into the position deviation signal PER by means of the amplifier 105, synchronous rectifier circuit 107 and smoothing filter 108, the signal PER being proportional to the value of sin $(\theta - \alpha)$ and having a sign which is in accordance with the rotational direction of the secondary winding. The absolute value circuit 109 delivers the absolute value of the position deviation signal PER and the sign sensing circuit 112 senses the sign of the signal prior to its input to the absolute value circuit. Thd voltage-frequency converter 110 generates a pulse train PL of a frequency proportional to the position deviation signal PER. The bi-directional counter 102a in the primary voltage generating circuit 102 is adapted to count these pulses up or down in accordance with a signal, obtained from the sign sensing circuit 112, indicative of the sign of the position deviation signal PER. The cosine-wave generator circuit 102b and sine-wave generator circuit 102c generate the primary voltages shown in FIGS. 5(A) and 5(B), respectively, in accordance with the content of the reversible counter 102a. The primary voltages thus generated are in turn applied to the excitation circuit 103 which responds by exciting the primary windings 101a, 101b of the resolver 101. This operation continues in the manner described so that the electrical angle $\alpha$ follows the mechanical angle $\alpha$, with the result that there is a gradual decrease in the amplitude of the error signal ERS. When the electrical angle $\alpha$ finally is brought into agreement with the mechanical angle $\theta$, the error signal ERS and positional deviation signal PER both become zero. The voltage-frequency converter 110 therefore can no longer generate pulses, so that the electrical angle $\alpha$ is locked at the value of the mechanical angle $\theta$ (i.e., $\alpha = \theta$). The counter circuit 113 counts the number of pulses generated in the foregoing process to give an indication, in terms of the counted value, of the distance moved by the moving object. If the pulses are counted up or counted down in accordance with the direction of movement, the value of the count within the counter circuit gives an indication of the current position of the moving body. Moreover, the pulse speed or frequency gives an indication of the travelling speed of the moving body.

The foregoing description deals with a case where the secondary winding 101c rotates by a small angle $\theta_o$ and then stops. In a case where the secondary coil 101c is continuously rotating at a constant speed, however, the error angle $(\theta - \alpha)$ will, under static conditions, take on a constant value which will conform to the rotational speed. The electrical angle $\alpha$ will vary at the same speed as the mechanical angle $\theta$, which speed is proportional to the value of sin $(\theta - \alpha)$.

It has been pointed out above that an error arises in the position sensing operation effected by a DSCG position sensing system unless $E_{c1}$ and $E_{s1}$ are made equal, as apparent from equation (3). $E_{c1}$ and $E_{s1}$ will not be equal in equation (3) even if $E_{c0}$ and $E_{s0}$ are made equal in equations (1) and (2). This follows from the fact that the degree of electromagnetic coupling between the cosine excitation coil and the secondary winding, which is the sensing coil, is different from the degree of electromagnetic coupling between the sine excitation coil and the secondary winding. The method and apparatus provided by the present invention enable $E_{c1}$ and $E_{s1}$ to be made equal with a high level of reliability through very simple means. The arrangement of the present invention is such that $E_{s1}$ is made equal to $E_{c1}$ by correcting the primary voltage amplitudes $E_{c0}$, $E_{s0}$ appearing in equations (1) and (2). The principle of the correcting operation will be described with reference to FIG. 1.

Assume that the electrical angle $\alpha$ is forced to take on the value $\alpha_1$ at a position ($\theta = 0°$) where there is electromagnetic coupling solely between the cosine excitation coil $1b$ and the secondary winding 2. The output $E_{o1}$ delivered by the secondary winding at such time is found from equation (3):

$$E_{o1} = -E_{s1} \cdot \sin\alpha_1 \cdot \sin \omega t \qquad (9).$$

This is equivalent to the second term on the right-hand side of equation (3). Similarly, if the electrical angle $\alpha$ is forced to take on the value $(90° + \alpha_1)$ at a position ($\theta = 90°$) where there is electromagnetic coupling solely between the sine excitation coil $1a$ and the secondary winding 2, the output $E_{o2}$ delivered by the secondary winding at such time is found from equation (3):

$$E_{o2} = E_{c1} \cdot \sin\alpha_1 \cdot \sin \omega t \qquad (10).$$

This is equivalent to the first term on the right-hand side of equation (3). If $E_{o1}$ and $E_{o2}$ in equation (9) and (10) are made equal, the equality $E_{s1} = E_{c1}$ will hold. In accordance with the invention, therefore, $E_{o1}$ and $E_{o2}$ are made equal by adjusting the primary excitation voltages $E_{s0}$, $E_{c0}$ which appear in equations (1) and (2).

In the foregoing, $\theta = 0°$ is taken as the position where electromagnetic coupling exists solely between the cosine excitation coil $1b$ and the secondary winding 2, and $\theta = 90°$ is taken as the corresponding position between the sine excitation coil $1a$ and the secondary winding 2. However, the conditions $\theta = 0°$, $\theta = 90°$ need not hold precisely; it will suffice if the conditions $\theta \approx 0°$, $\theta \approx 90°$ hold.

Figure 9:
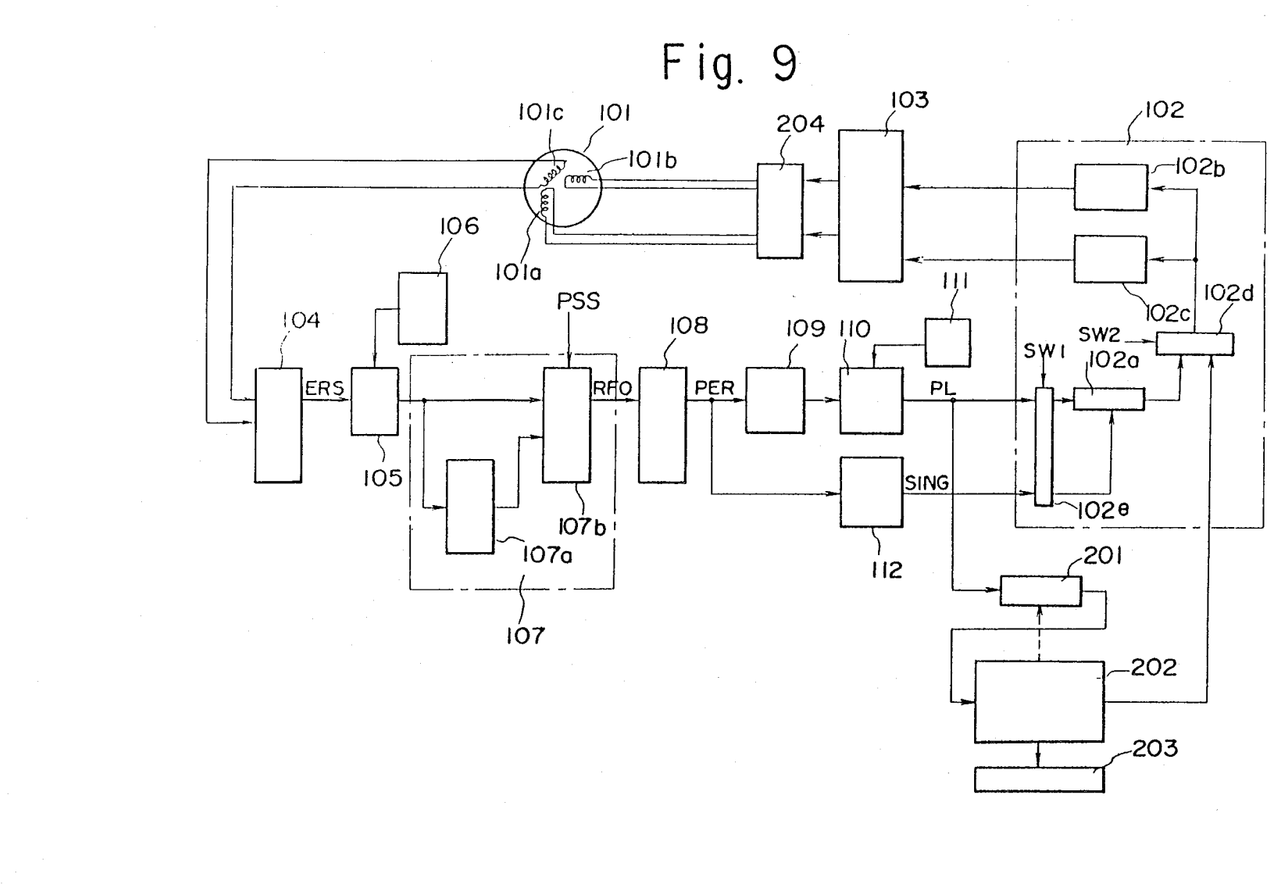
FIG. 9 is a block diagram useful in describing an embodiment of the present invention.

FIG. 9 is a block diagram useful in describing the method of, and an embodiment of the apparatus for, correcting an error in a position sensor, in accordance with the present invention. Portions identical with those shown in FIG. 6 are designated by like reference characters and need not be described again in detail.

In FIG. 9, a counter 201 is provided to count, for a predetermined period of time, the pulses PL generated by the voltage-frequency converter 110. A control circuit 202 is provided to forcibly change the electrical angle $\alpha$ and to start and stop the counting of the pulses PL as performed by the counter 201. A numerical display device 203 displays the value of the count within the counter 201, the value being obtained via the control circuit 202. An excitation voltage regulating circuit 204 regulates the output voltage of the resolver excitation circuit 103. Switching circuits 102d, 102e are provided within the primary voltage generating circuit 102. The switching circuit 102d supplies the cosine-wave generator circuit 102b and sine-wave generator circuit 102c with either the value of the count in the reversible counter 102a or the numerical value obtained from the control circuit 202. The switching circuit 102e controls the application of the pulses PL to the reversible counter 102a.

The method of the present invention will be described next.

First, assume that the switching circuit 102d is delivering the content of the reversible counter 102a. The first step in the method is to actuate a motor (not shown) which is connected directly to the resolver 101, the motor then being brought to rest at a position, namely $\theta = 0°$, where there is electromagnetic coupling solely between the cosine excitation coil $101b$ and the secondary winding $101c$. Moving the motor causes a difference to develop between the electrical angle $\alpha$ and the mechanical angle $\theta$, so that the electrical angle $\alpha$ is made to follow the mechanical angle $\theta$ to reestablish the condition $\alpha = \theta = 0°$, this being accomplished in exactly the same manner as in the conventional method. Next, a switching signal $SW_1$ is applied to the switching circuit 102e to remove the pulse train input PL and the sign signal input SING from the reversible counter 102a, thereby locking the electrical angle $\alpha$. Under such condition the output signal PER from the smoothing filter 108 is a voltage whose magnitude is equal to $E_{11}$ (approximately 0 volt). Next, and for a predetermined period of time $T_o$, the counter 201 is caused to count the pulses PL generated by the voltage-frequency converter 110, and the counted value $T_{11}$ is displayed on the numerical display device 203 through the control circuit 202. The value $T_{11}$, i.e., the number of pulses counted, is proportional to the output voltage $E_{11}$ of the smoothing filter 108. Following the measurement that gives $T_{11}$, a switching signal $SW_2$ is applied to the switching circuit 102d which responds by delivering a numerical value $N_1$ instructed by the control circuit 202. If the numerical value $N_1$ is set in advance so as to correspond to the electrical angle $\alpha_1$ (such as an angle of 9°), the smoothing filter 108 will deliver a voltage $E_{12}$ corresponding to a phase difference 9°. Next, after its content is cleared, the counter 201 is caused to count, for a predetermined period of time $T_o$, the pulses PL supplied by the voltage-frequency converter 110, and the counted value $T_{12}$ is displayed on the display device 203 through the control circuit 202. $T_{12}$ is proportional to $E_{12}$.

When the above operation for the measurements of $T_{11}$, $T_{12}$ is completed, that is, when $T_{11}$ and $T_{12}$ are obtained, the switching signals $SW_1$, $SW_2$ are set to logical "o" to restore the switching circuits 102e, 102d to their normal states. The motor (not shown) is then reactuated and stopped at a position, namely $\theta = 90°$, where there is electromagnetic coupling solely between the sine excitation coil $101a$ and the secondary winding $101c$. Moving the motor causes a difference to develop between the electrical angle $\alpha$ and the mechanical angle $\alpha$, so that the electrical angle is made to follow the mechanical angle $\theta$ to re-establish the condition $\alpha = \theta = 90°$. Again, this is accomplished in the same manner as practiced in the prior art. Next, the switching signal $SW_1$ is applied to the switching circuit 102e to remove the pulse train input PL and the sign signal input SING from the reversible counter 102e, thereby locking the electrical angle $\alpha$. Under such condition the output PER from the smoothing filter 108 is of a voltage whose magnitude is equal to $E_{21}$ (approximately 0 volt). Next, and for a predetermined period of time $T_o$, the counter 201 is caused to count the pulses PL generated by the voltage-frequency converter 110, and the counted value $T_{21}$ is displayed on the numerical display device through the control circuit 202. The value $T_{21}$, i.e., the number of pulses counted, is proportional to the output voltage $E_{21}$ of the smoothing filter 108. Following the measurement that gives $T_{21}$, the switching signal $SW_2$ is applied to the switching circuit 102d which responds by delivering a numerical value $N_2$ instructed by the control circuit 202. If the numerical value $N_2$ is set in advance so as to correspond to the electrical angle $\alpha_2 = \alpha_1 + 90°$, where $\alpha_1$ is 9°, the smoothing filter 108 will deliver a voltage $E_{22}$ corresponding to the phase difference of 9°. Next, after its content is cleared, the counter 201 is caused to count, for a predetermined period of time $T_o$, the pulses PL supplied by the voltage-frequency converter 110, and the counted value $T_{22}$ is displayed on the numerical display device 203 through the control circuit 202. $T_{22}$ is proportional to $E_{22}$.

Next, the following computations are performed:

$$T_1 = T_{12} - T_{11} \quad (11)$$

$$T_2 = T_{22} - T_{21} \quad (12),$$

and the primary excitation voltage is so regulated by the excitation voltage regulating circuit 204 as to establish equivalence between $T_1$ and $T_2$. If this operation is repeated, the condition $T_1 = T_2$ will eventually be established, allowing $E_{s1}$ and $E_{c1}$ in equation (3) to be rendered equal.

In accordance with the arrangement described above, $T_{11}$, $T_{12}$, $T_{21}$, $T_{22}$ are displayed successively on the numerical display device 203, the computations of equations (11) and (12) are performed separately, and the primary excitation voltage is so regulated as to establish the condition $T_1 = T_2$. It is also possible, however, to provide the control circuit 202 with a memory and arithmetic circuit to compute $(T_1 - T_2)$ automatically, and to arrange it so that a display is presented of the computed results, or of the relative sizes of $T_1$ and $T_2$.

Furthermore, in the embodiment described above, use is made of the pulse numbers $T_{11}$ through $T_{22}$ (which correspond to frequencies), these being the numbers of pulses generated by the voltage-frequency converter 110 during the predetermined period of time $T_o$. An alternative method would be to use the output voltages $E_{11}$ through $E_{22}$ obtained from the smoothing filter 108. Specifically, a voltmeter or AD converter can be connected to the output terminals of the smoothing filter to measure the values of $E_{11}$, $E_{12}$, $E_{21}$, $E_{22}$. $E_1$ and $E_2$ would then be found from $$E_1 = E_{12} - E_{11} \quad (13)$$

$$E_2 = E_{22} - E_{21} \quad (14),$$

and the excitation voltage regulating circuit 204 would then be used to regulate the primary excitation voltage to establish the condition $E_1 = E_2$.

$T_{11}$ and $T_{21}$ in equations (11) and (12) can be regarded as offset frequencies under the condition in which the pulse train input PL and sign signal input SING are removed from the reversible counter 102a. $E_{11}$ and $E_{12}$ in equations (13) and (14) can similarly be regarded as offset voltages. Accordingly, the frequency obtained by subtracting $T_{11}$ from $T_{12}$, and the frequency obtained by subtracting $T_{21}$ from $T_{22}$, each represent the true change in frequency produced by 9° of electrical angle ($\alpha$) movement. Likewise, the voltage obtained by substracting $E_{11}$ from $E_{12}$, and the voltage obtained by subtracting $E_{21}$ from $E_{22}$, each represent the true change in voltage produced by 9° of electrical angle ($\alpha$) movement. In accordance with this embodiment of the present invention, therefore, equivalence between $E_{s1}$ and $E_{c1}$ in equation (3) can be established with a high accuracy.

In accordance with the present invention as described above, $E_{c1}$ and $E_{s1}$ in equation (3) can be made equal through a very simple method and appratus, thereby making it possible to correct a position error in a position sensing circuit so that the position sensing operation can be performed in a highly accurate manner. In performing the regulating operation that establishes equivalence between $E_{c1}$ and $E_{s1}$, even greater accuracy is obtained by taking the offset frequencies or offset voltages into consideration.

As many widely different embodiments of this invention may be made without departing from the spirit and scope thereof, it is to be understood that the invention is not limited to the specific embodiment thereof except as defined in the appended claims.

What we claim is:

1. A method of correcting the error in a position sensing circuit equipped with a sensor including:

primary windings comprising a sine excitation coil and a cosine excitation coil so disposed as to be electrically displaced in phase from each other by $\pi/2$, said sine excitation coil and said cosine excitation coil being excited by a sine-wave primary voltage signal and a cosine-wave primary excitation signal, respectively, each having an amplitude proportional to sin $\alpha$ and to cos $\alpha$, respectively, for generating an AC flux having an electrical angle $\alpha$ and a constant amplitude, and a secondary winding which is moved rotatively or linearly with respect to the primary windings in accordance with the movement of a movable body driven by a motor, for producing a sinusoidal secondary voltage signal having an amplitude in accordance with the difference between the electrical angle $\alpha$ and a mechanical angle $\theta$ corresponding to the amount the movable body is moved;

a smoothing circuit operatively connected to said secondary winding, for smoothing the secondary voltage signal;

a voltage-to-frequency converter operatively connected to said smoothing circuit, for generating a pulse train having a frequency varying in accordance with the output of said smoothing circuit; and a primary voltage signal generating circuit operatively connected to said voltage-to-frequency converter and to said primary windings, for generating said primary voltage signals, the electrical angle thereof varies in accordance with the number of pulses in the pulse train so as to make the quantity $(\theta - \alpha)$ equal to zero; said method comprising the steps of:

(a) moving the motor to a first position where said secondary winding is electromagnetically coupled mainly with said cosine excitation coil, and to a second position where said secondary winding is electromagnetically coupled mainly with said sine excitation coil;

(b) varying the electrical angle $\alpha$ by a predetermined amount at said first position and at said second position;

(c) obtaining, at said first position and at said second position, the amount of change in at least one of the following when said electrical angle $\alpha$ has been varied by said predetermined amount: the output voltage of said secondary winding, the number of pulses in said pulse train, and the frequency of said pulse train; and (d) regulating the excitation voltage of the primary winding constituting and sine excitation coil or said cosine excitation coil in such a manner that the amount of change at said first position and the amount of change at said second position will be equal.

2. A method of correcting the error in a position sensing circuit equipped with a sensor including:

primary windings comprising a sine excitation coil and a cosine excitation coil so disposed as to be electrically displaced in phase from each other by $\pi/2$, said sine excitation coil and said cosine excitation coil being excited by a sine-wave primary voltage signal and a cosine-wave primary excitation signal, respectively, each having an amplitude proportional to sin $\alpha$ and to cos $\alpha$, respectively, for generating an AC flux having an electrical angle $\alpha$ and a constant amplitude, and a secondary winding which is moved rotatively or linearly with respect to the primary windings in accordance with the movement of a movable body such as a motor, for producing a sinusoidal secondary voltage signal having an amplitude in accordance with the difference between the electrical angle $\alpha$ and a mechanical angle $\theta$ corresponding to the amount the movable body is moved;

a smoothing circuit operatively connected to said secondary winding, for smoothing the secondary voltage signal;

a voltage-to-frequency converter operatively connected to said smoothing circuit, for generating a pulse train having a frequency varying in accordance with the output of said smoothing circuit; and a primary voltage signal generating circuit operatively connected to said voltage-to-frequency converter and to said primary windings, for generating said primary voltage signal generating circuit for generating said primary voltage signals, the electrical angle $\alpha$ thereof varies in accordance with the number of pulses in the pulse train so as to make the quantity $(\theta - \alpha)$ equal to zero; said method comprising the steps of:

(a) moving the motor to a first position where said secondary winding is electromagnetically coupled mainly with said cosine excitation coil;

(b) causing the electrical angle $\alpha$ to follow the mechanical angle $\theta$, of said secondary winding;

(c) obtaining a value $T_{11}$ corresponding to one of the number of pulses in and the frequency of the pulse train generated by said voltage-to-frequency converter;

(d) shifting the electrical angle from said first position by a predetermined angle $\alpha_1$ under a condition in which rotation of the motor is inhibited;

(e) obtaining a value $T_{12}$, corresponding to one of the number of pulses in and the frequency of the pulse train generated by said voltage-to-frequency converter;

(f) moving the motor to a second position where said secondary winding is electromagnetically coupled mainly with said sine excitation coil;

(g) causing the electrical angle $\alpha$ to follow the mechanical angle $\theta$, of said secondary winding;

(h) obtaining a value $T_{21}$, corresponding to one of the number of pulses in and the frequency of the pulse train generated by said voltage-to-frequency converter;

(i) shifting the electrical angle from said second position by the predetermined angle $\alpha_1$ under a condition in which rotation of the motor is inhibited;

(j) obtaining a value $T_{22}$, corresponding to one of the number of pulses in frequency of the pulse train generated by said voltage-to-frequency converter; and (k) regulating the excitation voltage of at least one of the primary windings in such a manner that the quantity $(T_{12}-T_{11})$ and the quantity $(T_{22}-T_{21})$ are equal.

3. A method of correcting the error in a position sensing circuit equipped with a sensor including:

primary windings comprising a sine excitation coil and a cosine excitation coil so disposed as to be electrically displaced in phase form each other by $\pi/2$, said sine excitation coil and said cosine excitation coil being excited by a sine-wave primary voltage signal and a cosine-wave primary excitation signal, respectively, each having an amplitude proportional to sin $\alpha$ and to cos $\alpha$, respectively, for generating and AC flux having an electrical angle $\alpha$ and a constant amplitude, and a secondary winding which is moved rotatively or linearly with respect to the primary winding in accordance with the movement of a movable body such as a motor, for producing a sinusoidal secondary voltage signal having an amplitude in accordance with the difference between the electrical angle $\alpha$ and a mechanical angle $\theta$ corresponding to the amount the movable body is moved;

a smoothing circuit operatively connected to said secondary winding, for smoothing the secondary voltage signal;

a voltage-to-frequency converter operatively connected to said smoothing circuit, for generating a pulse train having a frequency varying in accordance with the output of said smoothing circuit; and a primary voltage signal generating circuit operatively connected to said voltage-to-frequency converter and to said primary windings, for generating said primary voltage signals, the electrical angle thereof varies in accordance with the number of pulses in the pulse train so as to make the quantity $(\theta - \alpha)$ equal to zero; said method comprising the steps of:

(a) moving the motor to a first position where said secondary winding is electromagnetically coupled mainly with said cosine excitation coil;

(b) causing the electrical angle $\alpha$ to follow the mechanical angle $\theta$, of said secondary winding;

(c) obtaining an output voltage $E_{11}$ generated by said smoothing circuit;

(d) shifting the electrical angle from said first position by a predetermined angle $\alpha_1$ under a condition in which rotation of the motor is inhibited;

(e) obtaining an output voltage $E_{12}$ generated by said smoothing circuit;

(f) moving the motor to a second position where said secondary winding is electromagnetically coupled mainly with said sine excitation coil;

(g) causing the electrical angle $\alpha$ to follow the mechanical angle $\theta$, of said secondary winding;

(h) obtaining an output voltage $E_{21}$ generated by said smoothing circuit;

(i) shifting the electrical angle from said second position by the predetermined angle $\alpha_1$ under a condition in which rotation of the motor is inhibited;

(j) obtaining an output voltage $E_{22}$ generated by said smoothing circuit; and (k) regulating the excitation voltage of at least one of the primary windings in such a manner that the quantity $(E_{12}-E_{11})$ and the quantity $(E_{22}-E_{21})$ are equal.

4. In an apparatus for correcting the error in a position sensing circuit equipped with a sensor including primary windings comprising a sine excitation coil and a cosine excitation coil so disposed as to be electrically displaced in phase from each other by $\pi/2$, and sine excitation coil and said cosine excitation coil being excited by a sine-wave primary voltage signal and a cosine-wave primary excitation signal, respectively, each having an amplitude proportional to sin $\alpha$ and to cos $\alpha$, respectively, for generating an AC flux having an electrical angle $\alpha$ and a costant amplitude, and a secondary winding which is moved rotatively or linearly with respect to the primary windings in accordance with the movement of a movable body driven by a motor, for producing a sinusoidal secondary voltage signal of an amplitude varying in accordance with the difference between the electrical angle $\alpha$ and a mechanical angle $\theta$ corresponding to the amount the movable body is moved;

a smoothing circuit operatively connected to said secondary winding, for smoothing the secondary voltage signal;

a voltage-to-frequency converter operatively connected to said smoothing circuit, for generating a pulse train having a frequency varying in accordance with the output of said smoothing circuit; and a primary voltage signal generating circuit operatively connected to said voltage-to-frequency converter and to said primary windings, for generating said primary voltage signals, the electrical angle $\alpha$ thereof varies in accordance with the number of pulses in the pulse train so as to make the quantity $(\theta-\alpha)$ equal to zero; an improvement comprising:

electrical angle varying means operatively connected to said primary windings, for varying the electrical angle $\alpha$ by a predetermined amount at a first position where said secondary winding is electromagnetically coupled mainly with said cosine excitation coil, and at a second position where said secondary winding is electromagnetically coupled mainly with said sine excitation coil;

regulating means operatively connected between said primary windings and said electrical angle varying means, for regulating the excitation voltage of said primary windings in such a manner that one of the amount of change in the output voltage of said secondary winding generated by the variation in the electrical angle, and the amount of change in a frequency responsive to said output voltage, is equal at said first and second positions;

means for computing values of one of the output voltage of said secondary winding, a frequency in accordance therewith, at said first and second positions, and a relation indicative of the relative size of the computed values at said first and second positions; and display means for displaying the results of the computation.

5. A method of correcting the error in a position sensing circuit according to claims 2 or 3, wherein in step (k) said at least one of the primary windings comprises said sine excitation coil.

6. A method of correcting the error in a position sensing circuit according to claims 2 or 3, wherein in step (k) said at least one of the primary windings comprises said cosine excitation coil.

* * * * *

UNITED STATES PATENT AND TRADEMARK OFFICE
CERTIFICATE OF CORRECTION

PATENT NO. : 4,352,050

DATED : Sept. 28, 1982

INVENTOR(S) : Sakano

It is certified that error appears in the above-identified patent and that said Letters Patent is hereby corrected as shown below:

Front page, [57] ABSTRACT, line 2, after "resolver," insert --such as--.

Col. 4, line 19, "=" should be -- - --.

Col. 5, line 16, "an" should be --as--;
line 24, "To" should be --Too--.

Col. 6, line 37, "$\alpha$" (second occurrence) should be --$\theta$--.

Col. 11, line 12, "and" should be --said--.

Col. 12, line 28, "form" should be --from--.

Col. 13, line 28, "and" should be --said--;
line 35, "costant" should be --constant--.

Signed and Sealed this

Eighth Day of March 1983

[SEAL]

Attest:

Attesting Officer

GERALD J. MOSSINGHOFF

Commissioner of Patents and Trademarks